(12) United States Patent
Oohashi et al.

(10) Patent No.: US 6,501,206 B2
(45) Date of Patent: Dec. 31, 2002

(54) STATOR OF DYNAMO-ELECTRIC MACHINE AND MANUFACTURING METHOD THEREFOR

(75) Inventors: Atsushi Oohashi, Tokyo (JP); Shoichiro Nishitani, Tokyo (JP); Yoshihiro Harada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/803,948

(22) Filed: Mar. 13, 2001

(65) Prior Publication Data

US 2002/0033649 A1 Mar. 21, 2002

(30) Foreign Application Priority Data

Sep. 12, 2000 (JP) ........................................ 2000-276403

(51) Int. Cl.[7] ............................. H02K 15/10; H02K 3/50
(52) U.S. Cl. ...................... 310/184; 310/180; 310/201; 310/45
(58) Field of Search ................................. 310/179, 184, 310/195, 201, 180, 42, 45

(56) References Cited

FOREIGN PATENT DOCUMENTS

| JP | 11-341730 | 12/1999 | ............ H02K/3/50 |
|---|---|---|---|
| JP | 2000-164043 | 6/2000 | ............ H01B/7/00 |
| JP | 2000-166148 | 6/2000 | ............ H02K/3/04 |
| JP | 2000-166150 | 6/2000 | ............ H02K/3/04 |

OTHER PUBLICATIONS

Japanese Patent Office Machine Translation of JP2000–164043, Jun. 16, 2000.*
Abstract JP11341730, Dec. 10, 1999.
Abstract EP1005137, May 31, 2000.
Abstract JP2000166150, Jun. 16, 2000.
Abstract JP2000164043, Jun. 16, 2000.

* cited by examiner

*Primary Examiner*—Burton S. Mullins
(74) *Attorney, Agent, or Firm*—Sughrue Mion, PLLC

(57) ABSTRACT

A stator of a dynamo-electric machine includes a cylindrical stator iron core having a plurality of slots arranged in a circumferential direction, and a stator winding composed of a plurality of conductor wires installed in the slots, the stator winding being formed by joining end portions of the plurality of conductor wires extending out of different ones of the slots at the end surface conductor sectional area of an end portion over a predetermined extent in a lengthwise direction from a distal end thereof is smaller than a conductor sectional area of a main portion, and an insulating film covers the main portion and a part of the end portion in the vicinity of the main portion, and a plurality of the conductor wires extending out of the different slots are joined with their end portions arranged properly.

9 Claims, 9 Drawing Sheets

STATOR OF DYNAMO-ELECTRIC MACHINE AND MANUFACTURING METHOD THEREFOR

This application is based on Application No. 2000-276403, filed in Japan on Sep. 12, 2000, the contents of which are hereby incorporated by reference.

BACKGROUND OF THE INVENTION

1. Field of the Invention

The present invention relates to a stator of a dynamo-electric machine of, for example, an automotive alternator or the like, and a manufacturing method and a connecting conductor wire for the stator, and a manufacturing method for the connecting conductor wire.

2. Description of the Related Art

Hitherto, a variety of types of electric equipment use diverse types of conductor wires according to individual applications. In some applications, conductor wires are joined together for use.

In such a case, the end portions of conductor wires to be joined are arranged properly, and insulating films formed on the end portions are removed. Then, the stripped end portions are joined, and a new insulating resin is applied to the stripped portions that include the joined portion to complete the joining process of the conductor wires.

Such a joining method, however, has been posing a problem in that the entire distal ends of conductor wires to be joined are melted, requiring high calorie for joining them. There has been another problem in that an increase in heat gain during the joining process causes an increase in the temperature around the end portions of the conductor wires and deteriorates insulating films, with resultant deteriorated insulating properties.

To solve the aforesaid problems, there has been proposed in, for example, Japanese Unexamined Patent Application Publication No. 2000-164043, a conductor wire structure in which the end portions of the conductor wires to be joined are partly cut off to reduce cross-sectional areas of the wires so as to reduce a heat gain during a joining process.

FIG. 19 is a process chart illustrating a conventional process for connecting conductor wires disclosed in, for example, Japanese Unexamined Patent Application Publication No. 2000-164043.

In the conventional process for connecting conductor wires, two conductor wires 100 to be joined are first prepared, and insulating films 116 are removed from the areas around the end portions of the conductor wires 100 (step 1). Then, end portions 112 of the conductor wires 100 from which the insulating films 116 have been removed are partly cut off as illustrated to form cut portions 114 (step 2). Substantially half of the round section of each of the end portions 112 of the conductor wires 100 are cut off by forming the cut portion 114. The cross-sectional area is substantially reduced to half the area connected to the end portion 112. Then, the two conductor wires 100 are disposed in parallel to each other, with their cut portions 114 facing outward, the end portions 112 being arranged properly. Subsequently, the end portions 112 are joined by, for example, tungsten-inert-gas (TIG) welding (step 3). Finally, an insulating resin 120 is newly applied to a joined portion 118 and the area from which the insulating films 116 have been removed (step 4), thus completing the joining process of the two conductor wires 100.

As described above, in the conventional structure of the conductor wire, the end portion 112 of the conductor wire 100 is partly cut off to reduce the conductor sectional area, so that the insulating film 116 of the conductor wire 100 around the cut portion 114 is inevitably damaged. For this reason, after joining the end portions 112 of the conductor wires 100, the insulating resin 120 must be applied to a wide area including the joined portion 118. This has been posing a problem of poor working efficiency and an increase in the volume of the insulating resin 120, causing the joined portion of the conductor wires to bulge out.

The following will describe a case where the conductor wires having the conventional structure are applied to a stator 121 of an alternator.

As shown in FIG. 20, the stator 121 is equipped with a stator iron core 122 and a stator winding 123 composed of conductor wires 124 threaded through slots 122a of the stator iron core 122. In a coil end group 123a of the stator winding 123, joined portions 125, each being composed of welded end portions of two conductor wires 124 with an insulating resin 120 applied thereto, are aligned in two layers adjacently in one row in the radial direction on an end surface of the stator iron core 122, being disposed in two rows in the circumferential direction.

Since the end portions of the conductor wires 124 are partly cut off as in the case of the conductor wires 100 described above, the insulating film 116 around the cut-off area is damaged, causing the conductors to be exposed. The joined parts of the end portions of the conductor wires 124 are aligned adjacently in one row in the radial direction on the end surface of the stator iron core 122, being disposed in two rows in the circumferential direction. Hence, welded portions of the end portions of the conductor wires 124 aligned adjacently in the radial direction are likely to develop short-circuiting. If the insulating resin 120 is applied with a welded portion short-circuited, then the yield of the stator 121 will be reduced.

To prevent the yield from lowering, an inspection for checking the welded portions of the end portions of the conductor wires 124 for a short circuit is performed prior to the application of the insulating resin 120. A rejected workpiece must be subjected to a step for locating a short-circuited spot, then the short circuit must be corrected by separating the short-circuited welded portions in the radial direction by hand.

It is extremely difficult to locate a short-circuited spot. The step for correcting a short circuit requires the manufacturing line of stators be stopped, and is implemented by hand, leading to significantly reduced productivity and increased cost.

Furthermore, since the insulating resin 120 must be applied to a large sectional area in the vicinity of the cut portion, the joined portion 125 bulges out, adding to a radial dimension and a circumferential dimension. This prevents the stator 121 from being made smaller, and adversely affects the multi-row configuration of the joined portions 125.

SUMMARY OF THE INVENTION

The present invention has been made with a view toward solving the above problems, and it is an object of the present invention to provide a stator of a dynamo-electric machine and a manufacturing method for the same, and a connecting conductor wire and a manufacturing method for the same in which an end portion of a conductor wire is plastically deformed to minimize the chances of damage to an insulating film and to reduce a cross-sectional area of the end portion thereby to reduce heat gain during a joining process and secure good insulating properties. Moreover, the occurrence of short circuits between joined portions will be structurally prevented so as to obviate the need for manual correction of short circuits that used to be necessary in the conventional art, thus allowing higher productivity and lower cost to be achieved.

To this end, according to one aspect of the present invention, there is provided a stator of a dynamo-electric machine that is equipped with a cylindrical stator iron core having a plurality of slots arranged in a circumferential direction; and a stator winding composed of a plurality of conductor wires installed in the slots, the stator winding being formed by joining end portions of the plurality of conductor wires extending out of different ones of the slots at the end surface of the stator iron core, wherein the conductor wires are formed such that a conductor sectional area of an end portion over a predetermined extent in a lengthwise direction from a distal end thereof is smaller than a conductor sectional area of a main portion, and an insulating film covers the main portion and a part of the end portion in the vicinity of the main portion; and a plurality of the conductor wires extending out of the different slots are joined with their end portions arranged properly.

In a preferred form, the end portion of each of the conductor wires is formed of a tapered portion having its conductor sectional area continuously reducing from the main portion toward the distal end thereof and a constant-sectional-area portion extending from the tapered portion toward the distal end, the conductor sectional area thereof being kept unchanged.

In another preferred form, the end portions of the conductor wires are eccentric with respect to the main portion in the vicinity of the end portion, and arranged properly so that the end portions of the conductor wires are brought close to each other before they are joined.

In yet another preferred form, the outer peripheral surface of an end portion of the conductor wire at the opposite side from its counterpart has a curved surface when the end portions of the conductor wires are arranged properly.

In still another preferred form, the end portions of the conductor wires are formed to have substantially circular cross sections.

In a further preferred form, the end portions of the conductor wires are formed to have substantially elliptical cross sections.

In another preferred form, both circumferential side surfaces of the end portions of the conductor wires are formed to have a planar shape in a radial direction.

In another preferred form, the circumferential width of the end portion of the conductor wire is set to equal to or smaller than the circumferential width of the main portion.

According to another aspect of the present invention, there is provided a manufacturing method for a stator of a dynamo-electric machine having a cylindrical stator iron core having a plurality of slots arranged in a circumferential direction; and a stator winding composed of a plurality of conductor wires installed in the slots, each of the conductor wires being formed such that a conductor sectional area of an end portion over a predetermined extent in a lengthwise direction from a distal end thereof is smaller than a conductor sectional area of a main portion, the main portion and a part of the end portion in the vicinity of the main portion being covered with an insulating film, and the stator winding being formed by joining the end portions of the plurality of conductor wires extending out of different ones of the slots at the end surface of the stator iron core, with their end portions arranged properly, the method including a step for placing a metal block between a pair of the arranged end portions of the conductor wires and an adjoining one of the conductor wires; and a step for joining the pair of the end portions of the conductor wires while pressing the pair of the arranged end portions of the conductor wires against the metal block by a first pressurizing jig.

In a preferred form, the metal block is made of copper or a copper alloy.

In another preferred form, the pair of the arranged end portions of the conductor wires are joined while binding the end portions in the circumferential direction.

In yet another preferred form, the pair of the arranged end portions of the conductor wires are joined by heating them by a non-contact heating source.

In a further preferred form, the non-contact heating source uses an arc or plasma; the first pressurizing jig is metallic; the pair of the arranged end portions of the conductor wires are pressed against the metal block by the first pressurizing jig; the conductor wires adjacent to the pair of the arranged end portions of the conductor wires are also pressed against the metal block by a second pressurizing jig made of metal; and an output terminal of a power source for generating the non-contact heating source is connected to the first and second pressurizing jigs to join the pair of the arranged end portions of the conductor wires.

According to yet another aspect of the present invention, there is provided a manufacturing method for a stator of a dynamo-electric machine having a cylindrical stator iron core having a plurality of slots arranged in a circumferential direction; and a stator winding composed of a plurality of conductor wires installed in the slots, each of the conductor wires being formed such that a conductor sectional area of an end portion over a predetermined extent in a lengthwise direction from a distal end thereof is smaller than a conductor sectional area of a main portion, the main portion and a part of the end portion in the vicinity of the main portion being covered with an insulating film, and the stator winding being formed by joining the end portions of the plurality of conductor wires extending out of different ones of the slots at the end surface of the stator iron core, with their end portions arranged properly, the method including a step for plastically deforming a conductor wire rod, which has been entirely covered with the insulating film, for a predetermined extent thereof in a lengthwise direction from the distal end thereof so as to make the conductor sectional area of the end portion smaller than the conductor sectional area of the main portion; and a step for removing the insulating film from the end portion such that the insulating film remains on a part of the end portion in the vicinity of the main portion to complete the conductor wire.

According to yet another aspect of the present invention, there is provided a connecting conductor wire that is formed such that a conductor sectional area of an end portion over a predetermined extent in a lengthwise direction from a distal end thereof is smaller than a conductor sectional area of a main portion, wherein the main portion and a part of the end portion in the vicinity of the main portion are covered with an insulating film.

In a preferred form, the end portion is formed of a tapered portion having its conductor sectional area continuously reducing from the main portion toward the distal end thereof and a constant-sectional-area portion extending from the tapered portion toward the distal end, the conductor sectional area thereof being kept unchanged.

According to a further aspect of the present invention, there is provided a manufacturing method for a connecting conductor wire, including a step for plastically deforming a conductor wire, which has been covered with the insulating film, for a predetermined extent thereof in a lengthwise direction from the distal end thereof so as to make the conductor sectional area of the end portion smaller than the conductor sectional area of the main portion; and a step for removing the insulating film from the end portion such that the insulating film remains on a part of the end portion in the vicinity of the main portion.

DESCRIPTION OF THE PREFERRED EMBODIMENTS

The following will describe the embodiments of the present invention in conjunction with the accompanying drawings.

First Embodiment

Figure 1:
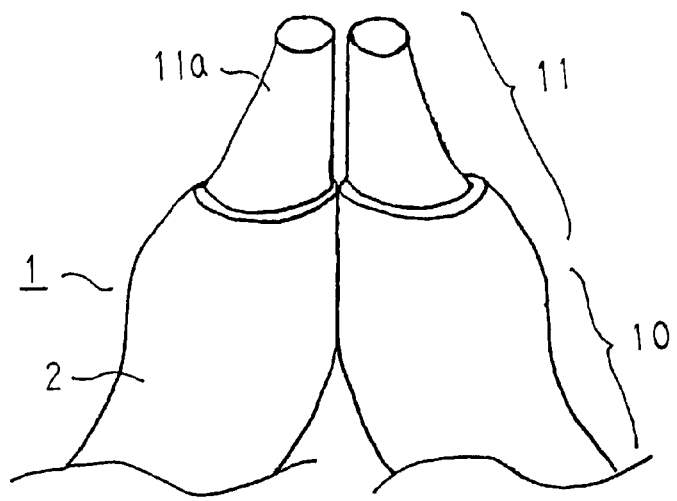
FIG. 1 is a perspective view showing end portions of connecting conductor wires in accordance with a first embodiment of the present invention.
Figure 2:
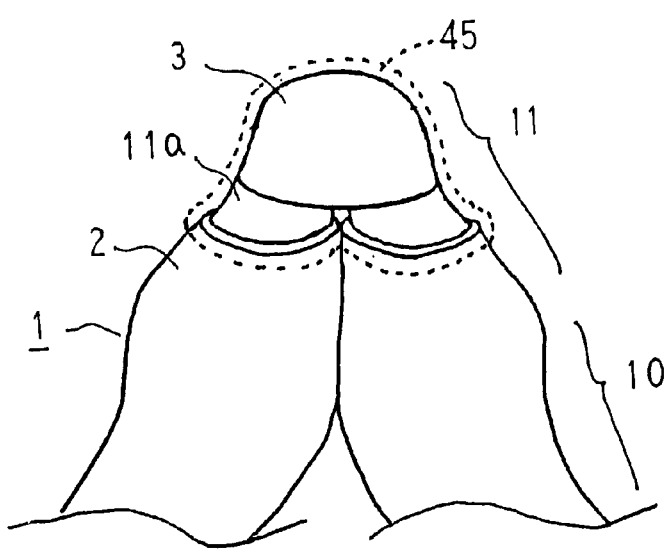
FIG. 2 is a perspective view showing a state wherein the connecting conductor wires in accordance with the first embodiment of the present invention have been joined.

FIG. 1 is a perspective view showing end portions of connecting conductor wires in accordance with a first embodiment of the present invention, and FIG. 2 is a perspective view showing a state wherein the connecting conductor wires in accordance with the first embodiment of the present invention have been joined.

Referring to FIG. 1, a connecting conductor wire 1 is composed of a copper wire rod that has a round cross section, and is covered with an insulating film 2 of enamel or the like. An end portion 11 extending to a predetermined extent from the distal end thereof in the lengthwise direction is tapered so that its conductor sectional area continuously reduces. A main portion 10 and a part of the end portion 11 in the vicinity of the main portion 10 are evenly covered with the insulating film 2, and a copper wire rod is exposed at a distal end portion 11a. The center of the section of the end portion 11 of the connecting conductor wire 1 is deflected toward an outer periphery with respect to the center of the section of the main portion 10 in the vicinity of the end portion 11.

Two connecting conductor wires 1 constructed as set forth above are evened, that is, are arranged properly and are made all of uniform height so that the end portions 11 are brought close to each other as shown in FIG. 1, and joined by, for example, arc welding. The connecting conductor wires 1 thus joined are coupled by a joint portion 3 in which the distal end portions 11a with the exposed copper wire rods have been fused into one piece, and the joint portion 3 and the proximal end side of the end portions 11 are covered with an insulating resin 45, as shown in FIG. 2.

In the connecting conductor wire 1, the end portion 11 over the predetermined extent in the lengthwise direction from the distal end thereof is tapered so that its conductor sectional area continuously reduces. The connecting conductor wire 1 is covered with the insulating film 2 except for the distal end portion 11a. Since the sectional area of the distal end portion 11a is smaller than the sectional area of the main portion 10, the heat gain required for joining is reduced.

The reduced heat gain for joining suppresses the possibility of damage to the insulating film 2. Moreover, since the end portion 11 is tapered, the joint portion 3 will not bulge out beyond the main portion 10 in the vicinity of the end portion 11 where the joint portion 3 is attached. In addition, the insulating film 2 covers up to a part of the end portion 11 in the vicinity of the main portion 10, so that the exposed part of the copper wire rod leans inward in relation to the outer periphery of the main portion 10 in the vicinity of the end portion 11.

Hence, even if the connecting conductor wire 1 is applied to an application wherein the joint portions 3 of the connecting conductor wires 1 are disposed closely to each other, short-circuiting between the joint portions 3 or between the joint portion 3 and the exposed part of the copper wire rod are suppressed, thus ensuring good insulating properties.

An insulating resin 45 for securing insulation need not be applied to cover the area of the main portion 10 in the vicinity of the end portion 11. In other words, the insulating resin 45 just need to be applied to the distal end portion 11a of the tapered end portion 11 and its neighborhood, thus making it possible to minimize the bulge of the entire joining portion including the insulating resin 45. This allows the connecting conductor wire 1 to be used even in an application where the joint portions 3 of the connecting conductor wires 1 are disposed closely to each other.

The manufacturing method for the connecting conductor wire 1 will now be described with reference to FIGS. 3A and 3B through FIGS. 5A and 5B.

Figures 3A, 3B:
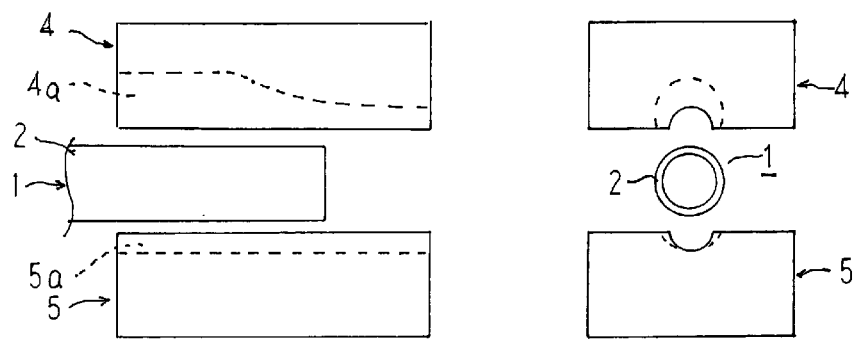
FIG. 3A and FIG. 3B are a side view and a front view illustrating a manufacturing method for the connecting conductor wire in accordance with the first embodiment of the present invention, respectively.
Figures 4A, 4B:
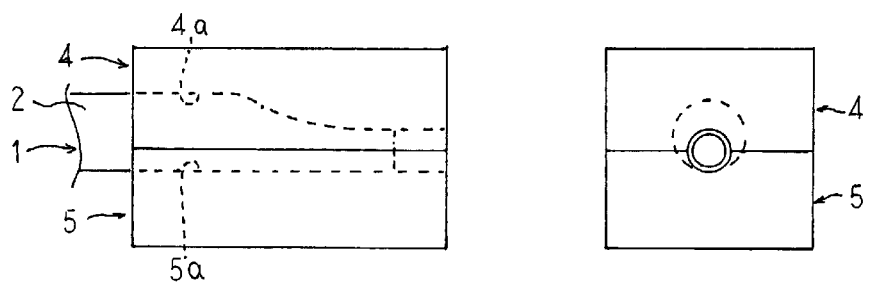
FIG. 4A and FIG. 4B are a side view and a front view illustrating the manufacturing method for the connecting conductor wire in accordance with the first embodiment of the present invention, respectively.
Figures 5A, 5B:
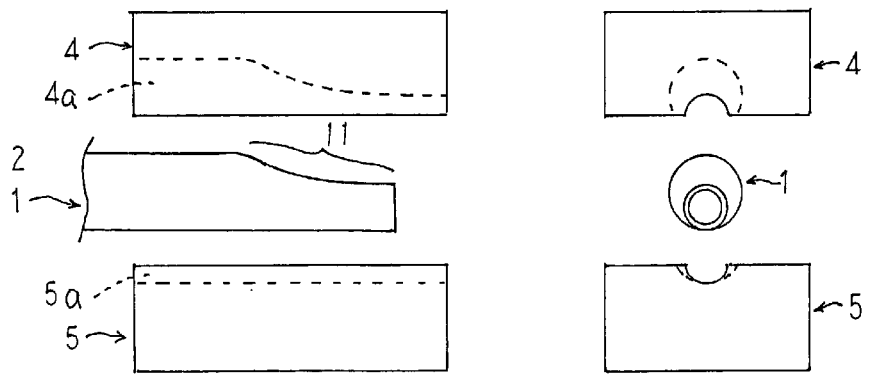
FIG. 5A and FIG. 5B are a side view and a front view illustrating the manufacturing method for the connecting conductor wire in accordance with the first embodiment of the present invention, respectively.

A molding cope 4 has a tapered groove 4a, and a molding drag 5 also has a tapered groove 5a. As shown in FIGS. 3A and 3B, the connecting conductor wire 1 that is provided with the insulating film 2 and has a circular cross section is placed between the molding cope 4 and the molding drag 5. Then, the connecting conductor wire 1 is pressurized by the cope 4 and the drag 5 to plastically deform the connecting conductor wire 1 into the shape defined by the grooves 4a and 5a, as shown in FIGS. 4A and 4B. Thereafter, as shown in FIGS. 5A and 5B, the cope 4 and the drag 5 are separated, and the connecting conductor wire 1 having the end portion 11 plastically deformed to have the tapered shape is taken out.

Subsequently, the insulating film 2 is removed from the distal end of the end portion 11 to complete the connecting conductor wire 1 shown in FIG. 1.

According to the manufacturing method, the plastically deformed end portion 11 of the connecting conductor wire 1 secures the adhesion of the insulating film 2 on the end portion 11, enabling the tapered end portion 11 to be formed without damaging the insulating film 2.

The following will describe a case where the connecting conductor wire 1 constructed as set forth above is applied to the stator of a dynamo-electric machine.

Figure 6:
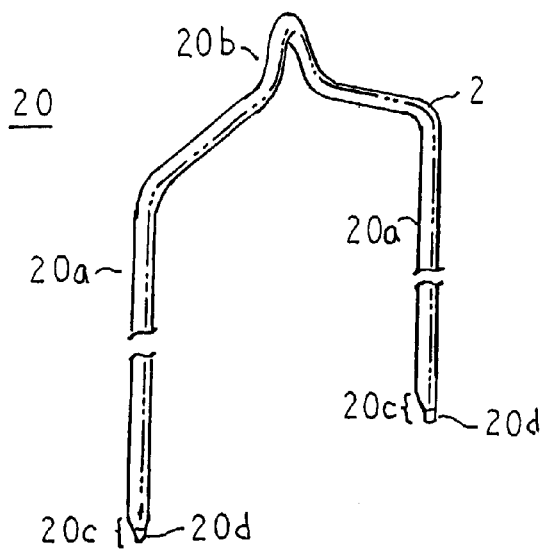
FIG. 6 is a schematic perspective view showing a conductor wire applied to a stator of an automotive alternator in accordance with the first embodiment of the present invention.
Figure 7:
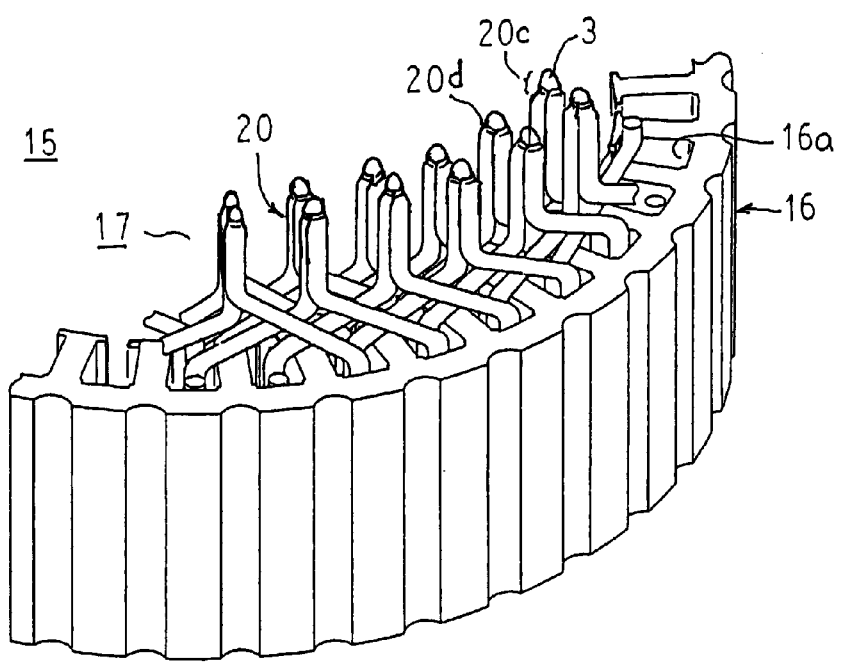
FIG. 7 is a perspective view of an essential section of the stator of the alternator in accordance with the first embodiment of the present invention.
Figure 8:
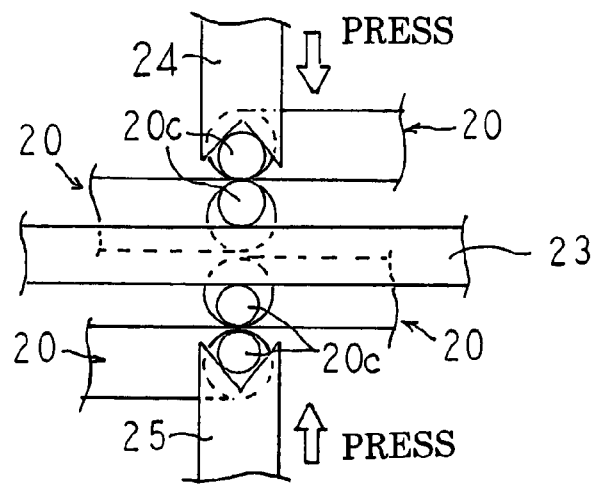
FIG. 8 is a schematic diagram illustrating a welding process in a manufacturing method for the stator of the alternator in accordance with the first embodiment of the present invention.
Figure 9:
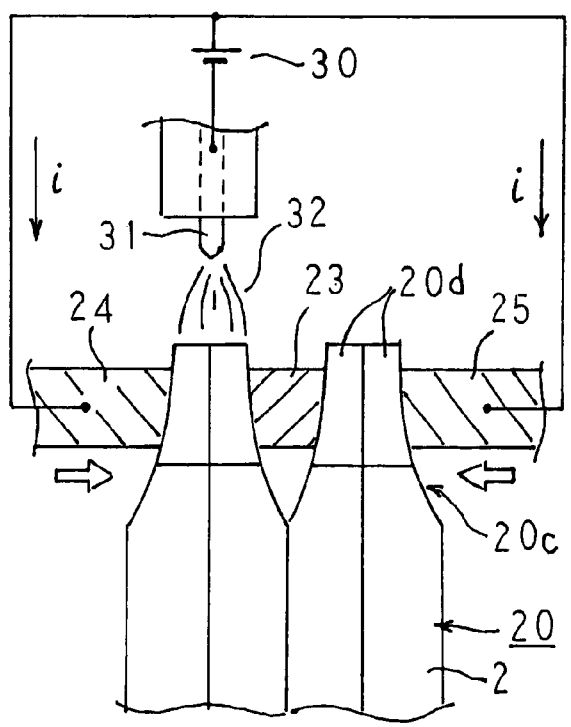
FIG. 9 is another schematic diagram illustrating the welding process in the manufacturing method for the stator of the alternator in accordance with the first embodiment of the present invention.

FIG. 6 is a schematic perspective view showing a conductor wire applied to a stator of an automotive alternator in accordance with the first embodiment of the present invention, FIG. 7 is a perspective view of an essential section of the stator of the alternator in accordance with the first embodiment of the present invention, FIG. 8 is a schematic diagram illustrating a welding process in a manufacturing method for the stator of the alternator in accordance with the first embodiment of the present invention, and FIG. 9 is another schematic diagram illustrating the welding process in the manufacturing method for the stator of the alternator in accordance with the first embodiment of the present invention.

Referring to FIG. 6, a conductor wire 20 applied to a stator 15 is formed by bending a connecting conductor wire 1 substantially into a U shape composed of a pair of straight portions 20a, which is a main portion, connected at a turn portion 20b. In the conductor wire 20, the end portions 20c extending from the distal ends to predetermined extents in the lengthwise direction are tapered, so that their sectional areas continuously become smaller toward their distal ends. The insulating film 2 has been removed from distal ends 20d of the end portions 20c to expose the copper wire rod. Furthermore, the sectional centers of the end portions 20c are shifted toward outer peripheries in relation to the sectional centers of the straight portions 20a in the vicinity of the end portions 20c. The insulating film 2 remains at the proximal end areas of the end portions 20c.

Referring to FIG. 7, a stator iron core 16 constituting the stator 15 is a cylindrical member formed of a magnetic steel constituent. The stator iron core 16 has slots 16a oriented axially and provided in the circumferential direction at predetermined intervals such that they open on the inner peripheral side. A stator winding 17 is constructed by joining the distal ends 20d of a plurality of the conductor wires 20 installed in the slots 16a.

To assemble the stator 15, the conductor wires 20, two each, are first inserted in a pair of the slots 16a spaced apart from each other by two slots from one end of the stator iron core 16. For the convenience of explanation, the locations in each slot 16a are assigned addresses in the ascending order from 1 to 4, beginning with the innermost location. To be more specific, one conductor wire 20 is inserted at the address of 1 of one of the paired the slots 16a, which are spaced two slots apart from each other, and at the address of 2 of the other slot 16a. The other conductor wire 20 is inserted at the address of 3 of the one slot 16a and at the address 4 of the other slot 16a. Thus, four straight portions 20a are accommodated in each slot 16a such that they are aligned in a single row in the direction of the depth of the slot.

After all the conductor wires 20 are installed on the stator iron core 16, the end portion of the conductor wire 20 extending from the address 1 of one slot 16a to the other end of the stator iron core 16 is bent outward, and the end portion of the other conductor wire 20 extending from the address 2 of the slot 16a, which is spaced apart from the above one slot 16a by two slots, to the other end of the stator iron core 16 is bent outward. Then, the two deflected end portions 20c are radially overlapped so that they are brought closer to each other. Furthermore, the end portion of the conductor wire 20 extending from the address of 3 of one slot 16a to the other end of the stator iron core 16 is bent outward, and the end portion of the other conductor wire 20 extending from the address of 4 of the slot 16a, which is spaced away from the above one slot 16a by two slots, to the other end of the stator iron core 16 is bent outward. Then, the two deflected end portions 20c are radially overlapped so that they are brought closer to each other.

Thus, at the other end of the stator iron core 16, two pairs of the end portions 20c aligned in a row in the radial direction are disposed in the circumferential direction.

Subsequently, as shown in FIG. 8, a metal block 23 is placed between two pairs of the end portions 20c aligned in the radial direction, and the end portions 20c of the respective pairs are pressed against the metal block 23 by a first metal pressurizing jig 24 and a second metal pressurizing jig 25. This causes the end portions 20c of each pair to be in close contact with each other and abut against the metal block 23.

Then, as shown in FIG. 9, an output terminal of an arc generating power source 30 is connected to the first pressurizing jig 24 and the second pressurizing jig 25, a torch 31 is brought close to the pair of the end portions 20c, and the arc generating power source 30 is turned ON. Thus, an arc 32 is produced between the torch 31 and the pair of the end portions 20c to heat and melt the distal ends 20d thereby to join them.

The same welding procedure is implemented on all pairs of the end portions 20c, then an insulating resin (not shown) is applied to the end portions 20c to cover the joints 3, thus completing the stator 15.

In the stator 15 fabricated as discussed above, the joint portions 3 of the end portions 20c are aligned in two layers in one row in the radial direction, being disposed in two rows in the circumferential direction, thus making up a coil end group on the other end of the stator winding 17.

Although not shown, at one end of the stator iron core 16, the bent portions 20b of the conductor wires 20 are aligned in two layers in one row in the radial direction, being disposed in two rows in the circumferential direction, thus making up a coil end group at one end of the stator winding 17.

The stator 15 constructed as discussed above employs the conductor wires 20 in which the end portions 20c extending from the distal ends over a predetermined extents in a lengthwise direction are tapered so that the conductor sectional areas continuously decrease, the insulating film 2 is removed from the distal ends 20d of the end portions 20c, and the copper wire rods are exposed. This arrangement reduces the heat gain during the joining process. Moreover, the rise in temperature in the vicinity of the distal ends 20d of the conductor wires 20 is suppressed, protecting the insulating properties from being impaired due to deterioration of the insulating film 2 at the proximal end areas of the end portions 20c. In addition, the insulating film 2 is removed from the conductor wires 20 except for the straight portions 20a and the proximal end areas of the end portions 20c, so that the proximal end areas of the end portions 20c of the conductor wires 20 remain covered by the insulating film 2, thus securely preventing short-circuiting from taking place between the joint portions 3 that are radially adjacent to each other.

Thus, short circuits between the joints 3 of the end portions 20c of the conductor wires 20 will no longer be detected in the short-circuit inspection step carried out prior to the step for applying an insulating resin. This obviates the need for taking the stators out of the manufacturing line to locate short-circuited spots and to correct short circuits by manually separating short-circuited joint portions in the radial direction. The result is dramatically improved productivity and yield and reduced cost in the manufacture of the stators 15.

In the conductor wire 20, the sectional center of the end portion 20c is deflected toward the outer periphery with respect to the sectional center of the straight portion 20a in the vicinity of the end portion 20c. The end portions 20c are arranged so that they are brought close and deflected toward each other and aligned in the radial direction. This arrangement improves welding efficiency.

In the conductor wire 20, the circumferential width of the end portion 20c is set to be equal to or smaller than the circumferential width of the straight portion 20a, making it possible to automate the insertion of the conductor wires 20 into the slots 16a of the stator iron core 16.

In the stator 15, the joint portions 3 are aligned adjacently to each other in the radial direction. The insulating film 2 on the proximal end areas of the end portions 20c incurs no damage, and the joint portions 3 do not bulge out, so that the straight portions 20a in the vicinity of the end portions 20c need not be covered by an insulating resin 45. Hence, the volume of the insulating resin 45 to be applied to cover the joint portions 3 will be reduced, and the radial width of the coil end group can be reduced, enabling the stator 15 to be made smaller.

In recent years, there has been a demand for providing more slots in the stator 15, which inevitably involves reduced circumferential intervals between the joint portions 3. In meeting the demand, the configuration of the conductor wire 20 does not cause an increase of the size of the stator 15, and good insulating properties can be secured because of the anti-short-circuit structure of the joint portions 3 of the conductor wires 20 and the smaller volume of the entire joint portions including the insulating resin 45.

The metal block 23 is placed between the two pairs of the end portions 20c, which are radially aligned, and one pair of the end portions 20c is pressed against the metal block 23 by the first metal pressurizing jig 24 to join the end portions 20c. Hence, the end portions 20c are maintained in close contact with each other when they are joined. This prevents welding separation failure in the joining process, and allows high joining strength to be achieved.

Since the end portions 20c have circular cross sections, even if the first pressurizing jig 24 is not aligned to the center of the end portion 20c when inserting the first pressurizing jig 24 from the radial direction to abut it against the end portion 20c, the distal end of the first pressurizing jig 24 is smoothly inserted by being guided by the outer peripheral surface of the end portion 20c. Moreover, the V-shaped distal end of the first pressurizing jig 24 restricts the circumferential play of the end portion 20c, permitting stable joining to be accomplished.

The welding separation failure can be further suppressed since the end portions 20c are radially aligned such that they are deflected toward each other when bringing them close to each other.

The joining is performed using the arc 32, which is a non-contact heat source; hence, the temperature of the distal ends 20d can be quickly raised to a joining temperature, thus minimizing the chance of damage to the insulating film 2.

Preferably, the metal block 23, the first pressurizing jig 24, and the second pressurizing jig 25 are made of copper or a copper alloy having good thermal conduction. Using the copper or a copper alloy suppresses a rise in temperature of the metal block 23, the first pressurizing jig 24, and the second pressurizing jig 25 during the joining process, and securely prevents fusing between the conductor wires 20 and the metal block 23, between the conductor wires 20 and the first pressurizing jig 24, and between the conductor wires 20 and the second pressurizing jig 25.

The pairs of the end portions 20c are pressed against the metal block 23 by the first pressurizing jig 24 and the second pressurizing jig 25, and the output terminal of the arc generating power source 30 is electrically connected to the first pressurizing jig 24 and the second pressurizing jig 25 to carry out welding. During the welding, current i flows in both radial directions of the arc 32, as indicated by the arrows in FIG. 9. With this arrangement, the influences of the magnetic fields produced by the current i are cancelled, so that the arc 32 is not deflected by the magnetic fields, ensuring stable welding quality.

Second Embodiment

Figure 10:
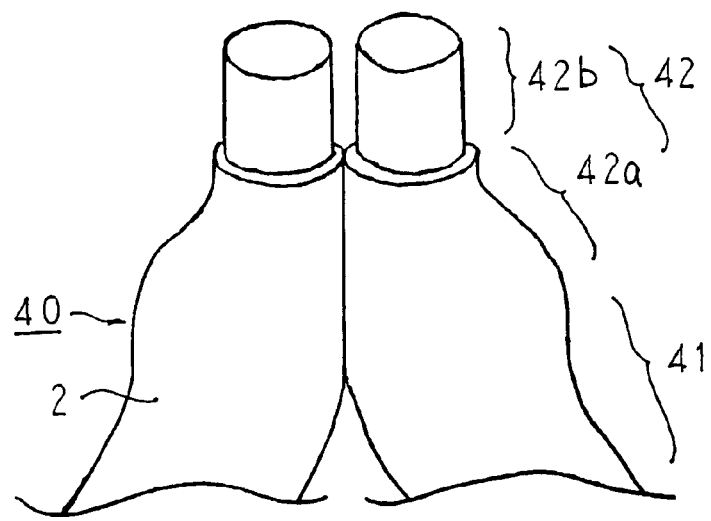
FIG. 10 is a perspective view showing end portions of connecting conductor wires in accordance with a second embodiment of the present invention.

In a second embodiment shown in FIG. 10, a connecting conductor wire 40 is made of a copper wire rod that has a round cross section, and is covered with an insulating film 2 of enamel or the like. An end portion 42 extending to a predetermined extent from the distal end thereof in the lengthwise direction has a tapered portion 42a having a conductor sectional area that continuously reduces toward the distal end thereof, and a constant-sectional-area portion 42b that extends from the tapered portion 42a toward the distal end while maintaining its conductor sectional area constant. A main portion 41 and the tapered portion 42a are evenly covered with the insulating film 2. The constant-sectional-area portion 42b has its copper wire rod exposed. The center of the section of the end portion 42 of the connecting conductor wire 40 is deflected toward an outer periphery with respect to the center of the section of the main portion 41 in the vicinity of the end portion 42. The end portion 42 of the connecting conductor wire 40 is also formed by plastic deformation as in the case of the first embodiment described above.

Figure 11:
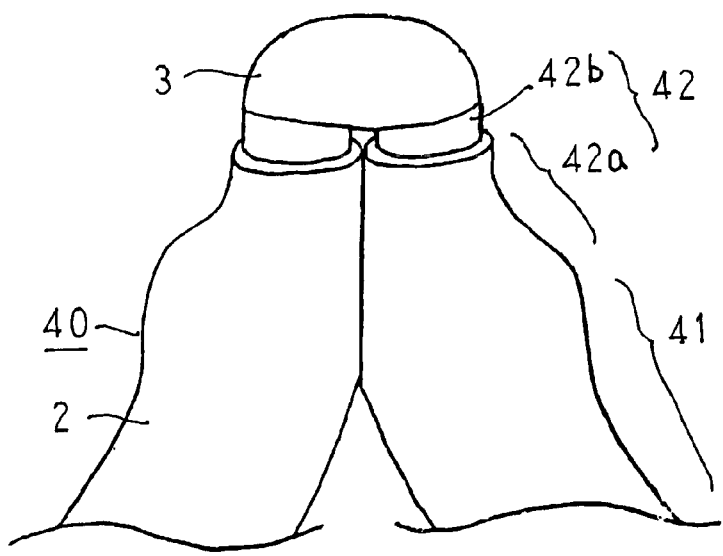
FIG. 11 is a perspective view showing a state wherein the connecting conductor wires in accordance with the second embodiment of the present invention have been joined.

Two connecting conductor wires 40 constructed as set forth above are arranged properly and are made all of uniform height so that the end portions 42 are brought close to each other as shown in FIG. 10, and joined by, for example, arc welding. The connecting conductor wires 40 thus joined are connected by a joint portion 3 in which the constant-sectional-area portions 42b with the exposed copper wire rods have been fused into one piece, as shown in FIG. 11.

Therefore, the connecting conductor wire 40 according to the second embodiment also provides the same advantages as those of the foregoing first embodiment.

Applying the connecting conductor wire 40 to a stator will provide the same advantages as those of the foregoing first embodiment.

Moreover, according to the second embodiment, the provision of the constant-sectional-area portion 42b allows easier clamp by the first pressurizing jig 24 at welding, ensuring stable welding quality.

In the second embodiment, the insulating film 2 is removed from the constant-sectional-area portion 42b to expose the copper wire rod. It is not necessary, however, to remove the insulating film 2 entirely from the constant-sectional-area portion 42b; instead, the insulating film 2 may be removed only from, for example, the distal end area of the constant-sectional-area portion 42b that is involved in a joining area.

Third Embodiment

Figure 12:
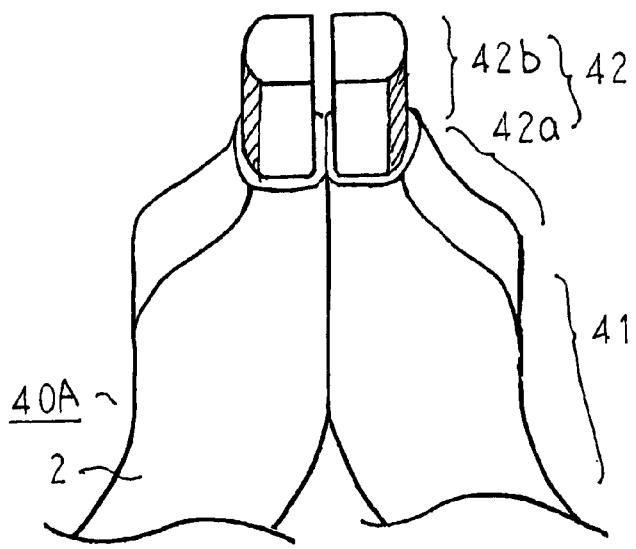
FIG. 12 is a perspective view showing end portions of connecting conductor wires in accordance with a third embodiment of the present invention.
Figure 13:
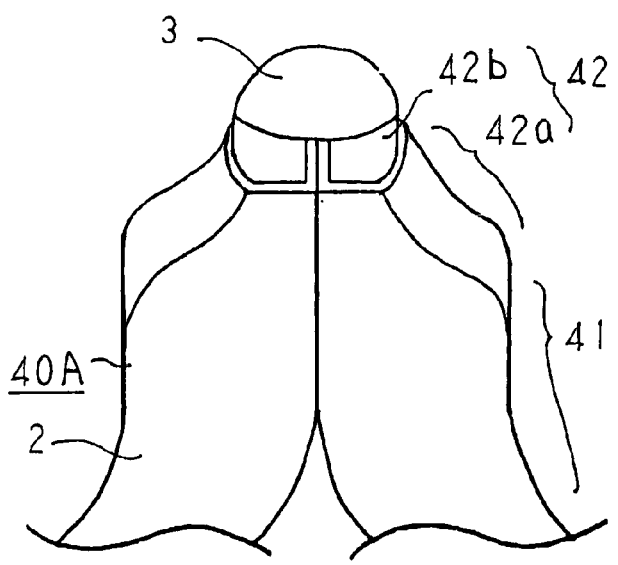
FIG. 13 is a perspective view showing a state wherein the connecting conductor, wires in accordance with the third embodiment of the present invention have been joined.

In the foregoing second embodiment, the connecting conductor wire 40 is made of a copper wire rod that has a round cross section, and is covered with the insulating film 2 of enamel or the like. According to a third embodiment, a connecting conductor wire 40A is made of a copper wire rod that is covered with an insulating film 2 of enamel or the like and has a rectangular cross section, as shown in FIG. 12 and FIG. 13.

Hence, the third embodiment also provides the same advantages as those of the foregoing second embodiment.

The connecting conductor wire 40A according to the third embodiment employs the copper wire rod having the rectangular cross section; hence, the connecting conductor wire 40A allows a greater space factor of conductor wires in slots when it is applied to a stator winding, with a consequent higher output of the stator.

Fourth Embodiment

Figure 14:
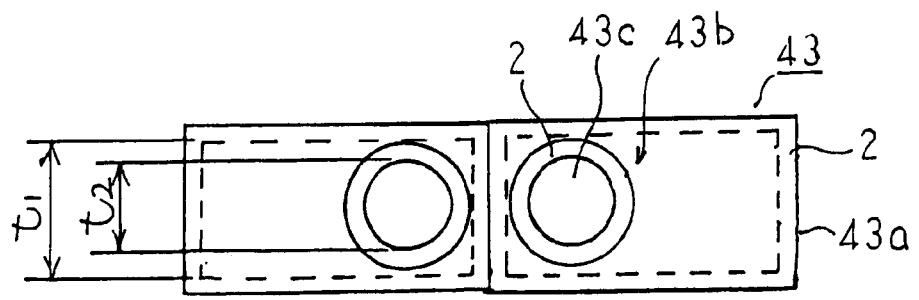
FIG. 14 is a schematic top view showing a conductor wire applied to a stator of an automotive alternator in accordance with a fourth embodiment of the present invention.
Figure 15:
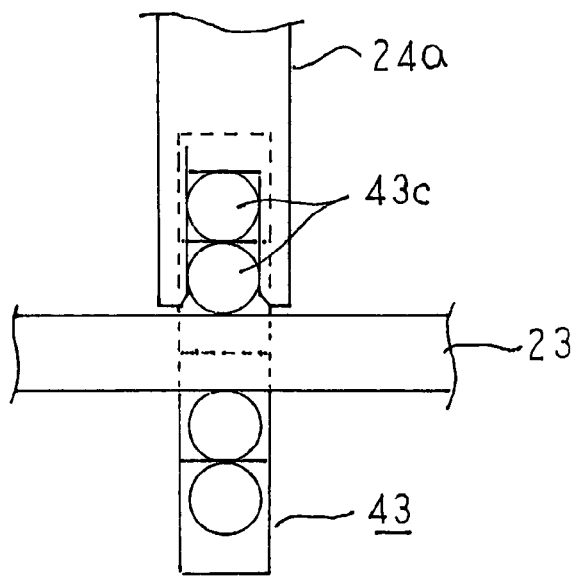
FIG. 15 is a schematic diagram illustrating a welding process in a manufacturing method for the stator of the alternator in accordance with the fourth embodiment of the present invention.

FIG. 14 is a schematic top plan view showing a conductor wire applied to a stator of an automotive alternator in accordance with a fourth embodiment of the present invention, and FIG. 15 is a schematic diagram illustrating a welding process in a manufacturing method for the stator of the alternator in accordance with the fourth embodiment of the present invention.

Referring to FIG. 14, a conductor wire 43 according to the fourth embodiment is formed by bending a copper wire rod substantially into a U shape, the copper wire rod being covered with an insulating film 2 and having a rectangular cross section. An end portion 43b extending from the distal end over a predetermined extent in the lengthwise direction has a round cross section, and is tapered beforehand so that its conductor sectional area continuously decreases toward the distal end thereof. The insulating film 2 is removed from a distal end 43c of the end portion 43b, exposing the copper wire rod. Furthermore, the sectional center of the distal end 43c is deflected to one side with respect to the sectional center of a straight portion 43a in the vicinity of the end portion 43b. The insulating film 2 remains on a proximal end area of the end portion 43b. The end portions 43b are aligned in the radial direction such that they are deflected to come close to each other. A width t1 of the straight portion 43a, which is a main portion, and a width t2 of the distal end 43c have an established relationship represented by $t1 \geq t2$.

The end portions 43b are pressed against a metal block 23 by a forked first pressurizing jig 24a so as to be joined, as illustrated in FIG. 15.

According to the fourth embodiment, the end portion 43b of the conductor wire 43 is tapered to have its conductor sectional area continuously decreasing toward the distal end, so that the same advantages as those of the foregoing first embodiment can be obtained.

The relationship between the width t1 of the straight portion 43a, which is a main portion, and a width t2 of the distal end 43c is $t1 \geq t2$, so that the conductor wires can be automatically inserted into a bending jig of a bending machine.

Since the distal ends 43c have round cross sections, even if the first pressurizing jig 24a is not aligned to the center of the distal end 43c when inserting the first pressurizing jig 24a from the radial direction, the first pressurizing jig 24a is smoothly inserted along the circular outer peripheral surface of the distal end 43c.

The forked first pressurizing jig 24a is able to securely restrict the circumferential play of the distal ends 43c, ensuring stable welding quality.

The rectangular section of the conductor wire 43 allows a greater space factor of conductor wires in slots.

Fifth Embodiment

Figure 16:
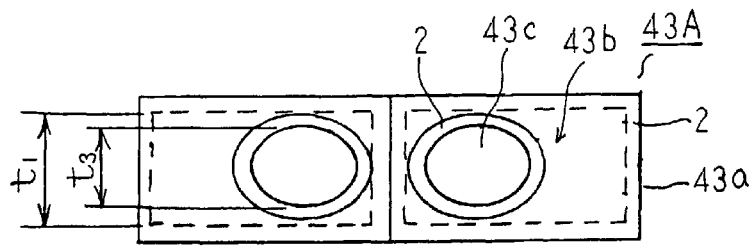
FIG. 16 is a schematic top view showing a conductor wire applied to a stator of an automotive alternator in accordance with a fifth embodiment of the present invention.

In a fifth embodiment shown in FIG. 16, a distal end 43c of a conductor wire 43A is formed to have an elliptical cross section. The relationship between a width t1 of a straight portion 43a, which is a main portion, and a width t3 of the distal end 43c is represented by $t1 \geq t3$. The rest of the construction is identical to the construction of the foregoing fourth embodiment.

Hence, the fifth embodiment will provide the same advantages as those of the foregoing fourth embodiment.

According to the fifth embodiment, since the distal end 43c is formed to have the elliptical cross section, the insertion resistance of the first pressurizing jig is lower than that in the fourth embodiment wherein the distal end 43c has a round section. The reduced insertion resistance suppresses wear on the jig.

Sixth Embodiment

Figure 17:
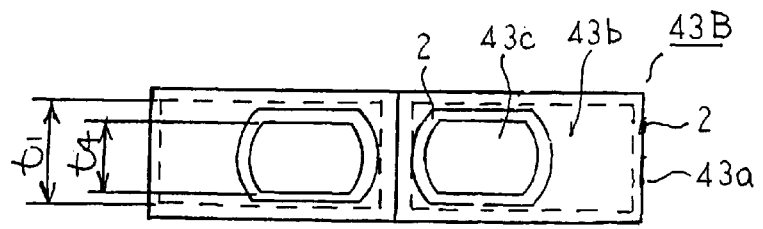
FIG. 17 is a schematic top view showing a conductor wire applied to a stator of an automotive alternator in accordance with a sixth embodiment of the present invention.

In the sixth embodiment shown in FIG. 17, a distal end 43c of a conductor wire 43B has both circumferential side surfaces of its section formed to be planar in the radial direction. The outer peripheral surfaces farther from a counterpart to be joined are formed into curved surfaces. The relationship between a width t1 of a straight portion 43a, which is a main portion, and a width t4 of the distal end 43c is represented by $t1 \geq t4$. The rest of the construction is identical to the construction of the foregoing fourth embodiment.

Hence, the sixth embodiment will provide the same advantages as those of the foregoing fourth embodiment.

According to the sixth embodiment, both circumferential side surfaces of the section of the distal end 43c are planar in the radial direction, so that the first pressurizing jig 24a can be inserted such that it surrounds both distal ends 43c to be joined. With this arrangement, both distal ends 43c can be clamped securely and stably, achieving further stable welding quality.

Seventh Embodiment

Figure 18:
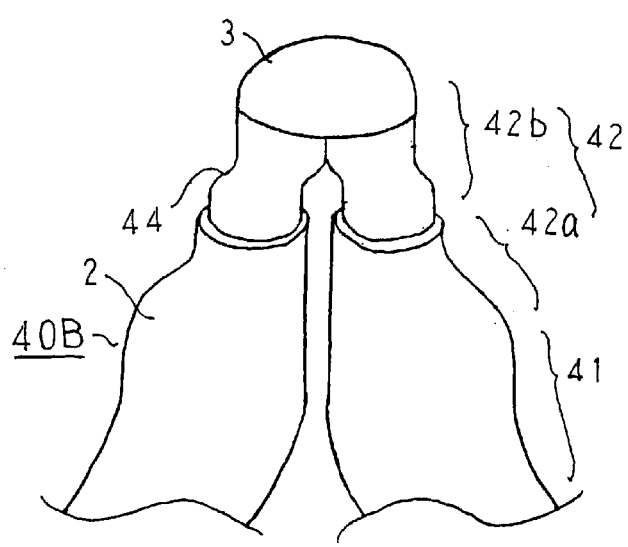
FIG. 18 is a perspective view showing a state wherein connecting conductor wires in accordance with a seventh embodiment of the present invention have been joined.
Figure 19:
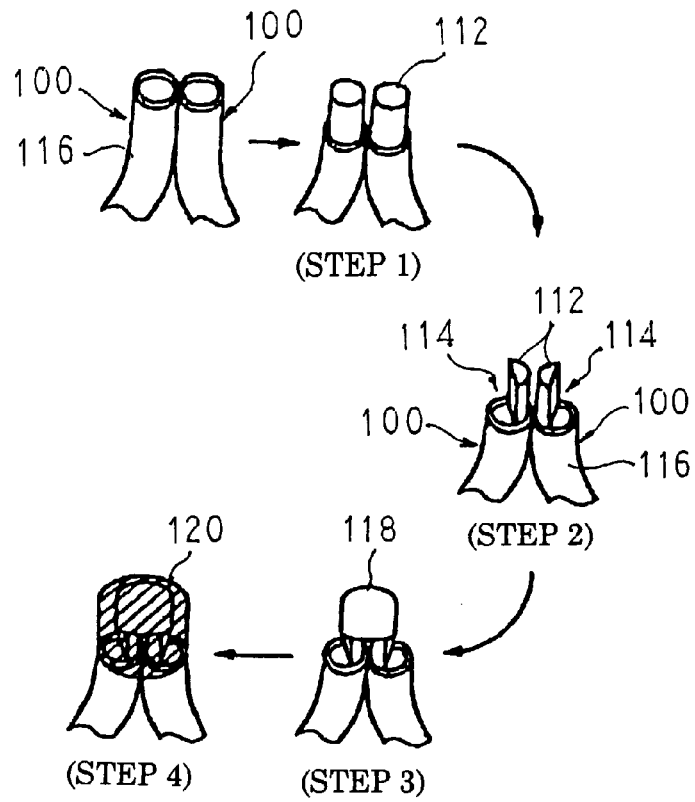
FIG. 19 is a process chart illustrating a joining process of conventional connecting conductor wires.
Figure 20:
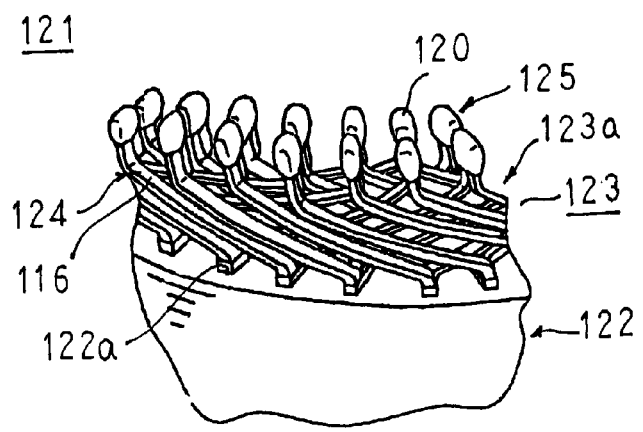
FIG. 20 is a perspective view of an essential section of a conventional stator of an automotive alternator.

In a seventh embodiment shown in FIG. 18, the distal end of a constant-sectional-area portion 42b of a connecting conductor wire 40B is further deflected toward the outer periphery by a curved step 44. The rest of the construction is identical to the construction of the foregoing second embodiment.

Hence, the seventh embodiment will provide the same advantages as those of the foregoing second embodiment.

According to the seventh embodiment, the distal end of the constant-sectional-area portion 42b of the connecting conductor wire 40B is further deflected to the outer periphery by the curved step 44; hence, when the end portions 42 are aligned in the radial direction at the time of joining, they are brought into close contact without a gap between the distal ends of the constant-sectional-area portions 42b. This arrangement securely prevents fusing separation failure at joining.

In the above embodiments, the copper wire rods are used for the conductor wires; however, the constituent of the conductor wires is not limited to the copper wire rod. For example, an aluminum wire rod may be used.

Similarly, although arc is used as the non-contact heat source in the above embodiments, the non-contact heat source is not limited to arc. For example, plasma, laser, or electron beam may be used.

The descriptions have been given of the embodiments wherein the present invention is applied to the stator of an automotive alternator. The present invention, however, will provide the same advantages when it is applied to other types of alternators or motors.

In the above embodiments, the descriptions have been given of the cases where the substantially U-shaped conductor wires are inserted in the slots, and the end portions of the conductor wires are joined to make up the stator winding. The present invention, however, will provide the same advantages when it is applied to a case where a conductor wire composed of a continuous wire is installed in slots and the end portions of the conductor wire are joined to make up a stator winding.

In the above embodiments, the end portions of the conductor wires inserted in the slots are aligned in the radial direction and joined. The present invention, however, may be also applied to a case where the end portions of conductor wires inserted in slots are aligned in the circumferential direction and joined, or to a case where the end portions of conductor wires inserted in slots are shifted in the circumferential direction and aligned in the radial direction to join them.

In the above embodiments, the end portions of two conductor wires extending from different slots on the end surface of the stator iron core are joined. The present invention, however, may be applied to a case where the end portions of three or more conductor wires extending from different slots are joined into one piece, e.g., to a connection of a neutral point for ac-connecting the windings of the respective phases of a stator winding.

The described features of the present invention provide the following advantages.

The stator of a dynamo-electric machine in accordance with the present invention includes a cylindrical stator iron core having a plurality of slots arranged in a circumferential direction; and a stator winding composed of a plurality of conductor wires installed in the slots, the stator winding being formed by joining end portions of the plurality of conductor wires extending out of different ones of the slots at the end surface of the stator iron core, wherein the conductor wires are formed such that a conductor sectional area of an end portion over a predetermined extent in a lengthwise direction from a distal end thereof is smaller than a conductor sectional area of a main portion, and an insulating film covers the main portion and a part of the end portion in the vicinity of the main portion; and a plurality of the conductor wires extending out of the different slots are joined with their end portions arranged properly. Hence, short-circuiting between joined portions can be securely prevented, the need for manual corrections of short circuits by separating joined portions prior to the insulating resin application step is obviated, and the volume of the entire joined portions including the insulating resin is reduced, making it possible to accomplish a stator of a dynamo-electric machine that permits higher productivity, reduced cost, and a reduced size.

The end portion of each of the conductor wires may be formed of a tapered portion having its conductor sectional area continuously reducing from the main portion toward the distal end thereof and a constant-sectional-area portion extending from the tapered portion toward the distal end, the conductor sectional area thereof being kept unchanged, so that the end portions of the conductor wires can be easily clamped when joining them. This ensures stable welding quality, secures adhesion of an insulating film on the tapered portion when deforming the conductor wire, and suppresses short-circuiting between adjacent connecting conductor wires.

The end portions of the conductor wires may be eccentric with respect to the main portion in the vicinity of the end portion, and arranged properly so that the end portions of the conductor wires are brought close to each other before they are joined. Hence, the gap between the end portions of the conductor wires to be joined is reduced, preventing joining failure in which the end portions are separated in a fused state. In addition, a gap between the end portions of the conductor wires to be joined and a conductor wire adjacent to them is secured, preventing the adjacent conductor wire from being erroneously involved and joined.

When the end portions of the conductor wires are arranged properly, the outer peripheral surface of an end portion of the conductor wire at the opposite side from its counterpart may be formed to have a curved surface. This ensures smooth insertion of a jig used to press the end portions of conductor wires to join them.

The end portions of the conductor wires may be formed to have substantially circular cross sections. Therefore, even if the inserting direction of a jig is misaligned to the center of an end portion at the time of joining, the jig can be smoothly inserted by being guided by the circular outer peripheral surface of the end portion.

The end portions of the conductor wires may be formed to have substantially elliptical cross sections, so that the insertion resistance of a jig is reduced, allowing wear on the jig to be suppressed.

Both circumferential side surfaces of the end portions of the conductor wires may be formed to have a planar shape in a radial direction. This enables the end portions of the conductor wires to be stably clamped by a jig when joining the end portions.

The circumferential width of the end portion of the conductor wire may be set to equal to or smaller than the circumferential width of the main portion, so that automatic insertion of the conductor wires into slots can be achieved.

The inventiove manufacturing method for a stator of a dynamo-electric machine having a cylindrical stator iron core having a plurality of slots arranged in a circumferential direction; and a stator winding composed of a plurality of conductor wires installed in the slots, each of the conductor wires being formed such that a conductor sectional area of an end portion over a predetermined extent in a lengthwise direction from a distal end thereof is smaller than a conductor sectional area of a main portion, the main portion and a part of the end portion in the vicinity of the main portion being covered with an insulating film, and the stator winding being formed by joining the end portions of the plurality of conductor wires extending out of different ones of the slots at the end surface of the stator iron core, with their end portions arranged properly, the method including a step for placing a metal block between a pair of the arranged end portions of the conductor wires and an adjoining one of the conductor wires; and a step for joining the pair of the end portions of the conductor wires while pressing the pair of the arranged end portions of the conductor wires against the metal block by a first pressurizing jig. Hence, a manufacturing method for a stator of a dynamo-electric machine can be obtained, whereby the end portions of the conductor wires to be joined can be maintained in close contact in a joining process so as to prevent the end portions from being separated in a fused state, and the end portions of conductor wires can be securely joined with high joining strength.

The metal block may be made of copper or a copper alloy, so that the temperature of the metal block is restrained to a low level even during a joining process, preventing fusing between the end portions to be joined and the metal block from taking place.

The pair of the arranged end portions of the conductor wires may be joined while binding the end portions in the circumferential direction. Hence, even if the pressing force is increased, the evened end portions are not disturbed, making it possible to suppress joining failure.

The pair of the arranged end portions of the conductor wires may be joined by heating them by a non-contact heating source, so that the temperature of the end portions can be quickly raised to a joining temperature, making it possible to minimize the chance of damage to an insulating film during the joining process.

The non-contact heating source uses an arc or plasma, the first pressurizing jig is metallic, the pair of the arranged end portions of the conductor wires are pressed against the metal block by the first pressurizing jig, the conductor wires adjacent to the pair of the arranged end portions of the conductor wires are also pressed against the metal block by a second pressurizing jig made of metal, and an output terminal of a power source for generating the non-contact heating source is connected to the first and second pressurizing jigs to join the pair of the arranged end portions of the conductor wires. With this arrangement, the arc or plasma is not bent by the magnetic fields produced by current passing for joining, permitting stable joining quality to be achieved.

The inventive manufacturing method for a stator of a dynamo-electric machine having a cylindrical stator iron core having a plurality of slots arranged in a circumferential direction; and a stator winding composed of a plurality of conductor wires installed in the slots, each of the conductor wires being formed such that a conductor sectional area of an end portion over a predetermined extent in a lengthwise direction from a distal end thereof is smaller than a conductor sectional area of a main portion, the main portion and a part of the end portion in the vicinity of the main portion being covered with an insulating film, and the stator winding being formed by joining the end portions of the plurality of conductor wires extending out of different ones of the slots at the end surface of the stator iron core, with their end portions arranged properly, the method including a step for plastically deforming a conductor wire rod, which has been entirely covered with the insulating film, for a predetermined extent thereof in a lengthwise direction from the distal end thereof so as to make the conductor sectional area of the end portion smaller than the conductor sectional area of the main portion; and a step for removing the insulating film from the end portion such that the insulating film remains on a part of the end portion in the vicinity of the main portion to complete the conductor wire. Hence, a manufacturing method for a stator of a dynamo-electric machine can be obtained, whereby the adhesion of the insulating film on the end portion having a smaller conductor sectional area can be secured, the chance of damage to the insulating film can be minimized, and short-circuiting between joints can be securely prevented.

The inventive connecting conductor wire that is formed such that a conductor sectional area of an end portion over a predetermined extent in a lengthwise direction from a distal end thereof is smaller than a conductor sectional area of a main portion, wherein the main portion and a part of the end portion in the vicinity of the main portion are covered with an insulating film. Hence, a connecting conductor wire can be obtained that is capable of realizing a joining structure that permits reduced calorie required for joining, suppressed deterioration of an insulating film at joining, and good insulating properties.

The end portion may be formed of a tapered portion having its conductor sectional area continuously reducing from the main portion toward the distal end thereof and a constant-sectional-area portion extending from the tapered portion toward the distal end, the conductor sectional area thereof being kept unchanged. This arrangement permits easier clamping for joining, allowing stable joining to be accomplished.

The inventive manufacturing method for a connecting conductor wire includes a step for plastically deforming a conductor wire, which has been covered with the insulating film, for a predetermined extent thereof in a lengthwise direction from the distal end thereof so as to make the conductor sectional area of the end portion smaller than the conductor sectional area of the main portion; and a step for removing the insulating film from the end portion such that the insulating film remains on a part of the end portion in the vicinity of the main portion. Hence, a manufacturing method for a connecting conductor wire can be obtained, whereby the adhesion of an insulating film on the end portion having a smaller conductor sectional area can be secured, minimizing the chance of damage to the insulating film.

What is claimed is:

1. A stator of a dynamo-electric machine, comprising:
    a cylindrical stator iron core having a plurality of slots arranged in a circumferential direction; and
    a stator winding composed of a plurality of conductor wires covered by an insulating film and installed in the slots, the stator winding being formed by joining end portions of the plurality of conductor wires extending out of different ones of the slots at the end surface of the stator iron core,
    wherein the conductor wires are formed such that a conductor sectional area of an end portion over a predetermined extent in a lengthwise direction from a distal end thereof is smaller than a conductor sectional area of a main portion, and said insulating film covers the main portion and only a part of the end portion in the vicinity of the main portion; and a plurality of the conductor wires extending out of the different slots are joined at their end portions.

2. A stator of a dynamo-electric machine according to claim 1, wherein the end portions of the conductor wires are eccentric with respect to the main portion in the vicinity of the end portion, and arranged so that the end portions of the conductor wires are brought close to each other before they are joined.

3. A stator of a dynamo-electric machine according to claim 1, wherein the end portion of each of the conductor wires is composed of a tapered portion having its conductor sectional area continuously reducing from the main portion toward the distal end of the end portion and a constant-sectional-area portion extending from the tapered portion toward the distal end, the conductor sectional area of the constant-sectional-area portion being kept unchanged.

4. A stator of a dynamo-electric machine according to claim 3, wherein the end portions of the conductor wires are eccentric with respect to the main portion in the vicinity of the end portion, and arranged so that the end portions of the conductor wires are brought close to each other before they are joined.

5. A stator of a dynamo-electric machine according to claim 1, wherein the outer peripheral surface of an end portion of the conductor wire at the opposite side from its counterpart presents a curved surface when the end portions of the conductor wires are arranged to be joined together.

6. A stator of a dynamo-electric machine according to claim 5, wherein the end portions of the conductor wires are formed to have substantially circular cross sections.

7. A stator of a dynamo-electric machine according to claim 5, wherein the end portions of the conductor wires are formed to have substantially elliptical cross sections.

8. A stator of a dynamo-electric machine according to claim 5, wherein both circumferential side surfaces of the end portions of the conductor wires are formed to have a planar shape in a radial direction.

9. A stator of a dynamo-electric machine according to claim 1, wherein the circumferential width of the end portion of the conductor wire is set to equal to or smaller than the circumferential width of the main portion.

* * * * *